United States Patent
Kim et al.

(10) Patent No.: US 8,081,960 B2
(45) Date of Patent: Dec. 20, 2011

(54) DEVICE AND METHOD FOR PROCESSING DATA RESOURCE CHANGING EVENTS IN A MOBILE TERMINAL

(75) Inventors: Jae-Ho Kim, Gumi-si (KR); Hyun-Ji Kim, Daegu (KR); Jeong-Wook Seo, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 825 days.

(21) Appl. No.: 11/357,342

(22) Filed: Feb. 21, 2006

(65) Prior Publication Data

US 2006/0190595 A1    Aug. 24, 2006

(30) Foreign Application Priority Data

Feb. 21, 2005  (KR) .................................. 2005-14195
Dec. 19, 2005  (KR) .............................. 2005-125464

(51) Int. Cl.
  *H04M 3/00*  (2006.01)
  *H04M 1/00*  (2006.01)
(52) U.S. Cl. ................... 455/418; 455/575.1; 455/420; 455/419
(58) Field of Classification Search .............. 455/575.1, 455/418–420, 92; 348/333.01–333.11, 211.3–211.13; 709/224
See application file for complete search history.

(56) References Cited

U.S. PATENT DOCUMENTS

| | | | | |
|---|---|---|---|---|
| 6,791,577 B2* | 9/2004 | Yoshioka | ...................... | 715/705 |
| 7,069,003 B2* | 6/2006 | Lehikoinen et al. | ....... | 455/414.2 |
| 2003/0046421 A1* | 3/2003 | Horvitz et al. | ................ | 709/238 |
| 2003/0087665 A1 | 5/2003 | Tokkonen | | |
| 2004/0174434 A1* | 9/2004 | Walker et al. | ............. | 348/211.3 |
| 2004/0233201 A1* | 11/2004 | Calkins et al. | ............... | 345/473 |

FOREIGN PATENT DOCUMENTS

| | | |
|---|---|---|
| CN | 1361646 A | 7/2002 |
| EP | 1 387 241 A2 | 2/2004 |
| JP | 2002 152345 A | 5/2002 |
| JP | 2002 300241 A | 10/2002 |

OTHER PUBLICATIONS

Muller, W. et al., "Face-to-face with your assistant. Realization issues of animated user interface agents for home appliances," *Computers and Graphics*, 2001, vol. 25, pp. 593-600, Darmstadt, Germany.

* cited by examiner

*Primary Examiner* — Charles Appiah
*Assistant Examiner* — Emem Stephen
(74) *Attorney, Agent, or Firm* — Roylance, Abrams, Berdo & Goodman, L.L.P.

(57) ABSTRACT

A device and method are disclosed for processing a data resource changing event in a mobile terminal by recommending a change from a specific, currently used data resource to a new data resource when the data resource has not been changed for a long time. The method for processing a data resource changing event in a mobile terminal comprises storing the data resource changing event occurring in the mobile terminal, confirming a specialist previously set to process the data resource changing event, calling the confirmed specialist to process the data resource changing event, and displaying an avatar and text according to event processing results.

10 Claims, 8 Drawing Sheets

DEVICE AND METHOD FOR PROCESSING DATA RESOURCE CHANGING EVENTS IN A MOBILE TERMINAL

PRIORITY

This application claims the benefit under 35 U.S.C. §119(a) of Korean Patent Application Nos. 2005-14195 and 2005-125464, filed Feb. 21, 2005 and Dec. 19, 2005, respectively, in the Korean Intellectual Property Office, the entire contents of which are hereby incorporated by reference.

BACKGROUND OF THE INVENTION

1. Field of the Invention

The present invention relates to a device and method for processing a data resource changing event in a mobile terminal. More particularly, the present invention relates to a device and method for processing a data resource changing event in a mobile terminal by recommending a change from a specific data resource currently used in the mobile terminal to a new data resource when the data resource has not been changed for a long period of time.

2. Description of the Related Art

Mobile terminals perform voice communication functions by transmitting or receiving a unique terminal identifier call message and voice data to or from a base transceiver station (BTS) through wireless communication paths. Such wireless communication paths include pilot, sync, phasing and traffic channels. Modern mobile terminals can offer short message services (SMS) and wireless Internet services. SMS is a simple and convenient means of communicating with any mobile audience. SMS can also be used for other diverse purposes, such as marketing and customer services. Mobile terminals also offer a wireless Internet mail service that enables users to send and receive wireless Internet mail messages. With the development of mobile technologies, mobile terminals have gone beyond merely being telephones and can now integrate various additional functions, such as camera and multimedia reproduction functions. Additional multimedia functions have become available in mobile terminals due to improvement of terminal display windows and the development of high-speed communication technologies.

Current mobile terminals having such additional functionality can be used as mobile entertainment systems. Nevertheless, a large number of users do not effectively use many functions because of the complexity of user interface (UI) and their busy daily lives.

For example, certain users maintain use of a single image once they set it as wallpaper for their mobile terminals. These users do not change the initially set wallpaper image to a new one, even though various images are available in their mobile terminals, and eventually become bored with the long used wallpaper. Also, users do not change the resource used for display or alarm purposes, such as ring tone, letter font, or icons (hereinafter referred to as "data resource"), for extended period of time because of the inconvenience in using user interfaces (UI) and their busy daily lives.

SUMMARY OF THE INVENTION

Accordingly, the present invention has been developed to solve the above-mentioned and other problems occurring in the prior art. Accordingly, it is an object of embodiments of the present invention to provide a device and method for processing a data resource changing event in a mobile terminal.

Another object of embodiments of the present invention is to provide a device and method for analyzing a data resource changing event occurring in a mobile terminal, selecting a character UI (User Interface) possessed by an appropriate specialist for the event and expressing the selected character UI.

Still another object of embodiments of the present invention is to provide a device and method for processing data resource changing in a mobile terminal by selecting a corresponding character UI (User Interface) and expressing the selected character UI.

Still another object of embodiments of the present invention is to provide a device and method for processing a data resource changing event in a mobile terminal by recommending a change from a specific data resource currently used in the mobile terminal to a new data resource when the data resource has not been changed for a long time.

Still another object of embodiments of the present invention is to provide a device and method for processing a data resource changing event in a mobile terminal which provides a mode for setting a resource changing timer to recommend a data resource change and thereby initiate a change in the data resource.

In accordance with a first aspect of embodiments of the present invention for accomplishing the above and other objects, there is provided a device for processing a data resource changing event in a mobile terminal The device comprises a memory for storing a character UI image for use in recommending a change of a data resource when a data resource changing event occurs in the mobile terminal. The device further comprises an event collection part for detecting the data resource changing event occurring in the mobile terminal and generating an event message for identifying the data resource changing event. The device still further comprises an agent control part having a specialist for recommending the data resource change when the data resource has not been changed during a period of time and selecting a character UI identification (ID) possessed by the specialist for the data resource changing event. The device additionally comprises an agent expression part for accessing and outputting character image and text corresponding to the character UI ID for the data resource changing event.

In accordance with a another aspect of embodiments of the present invention, there is provided a method for processing a data resource changing event in a mobile terminal. The method comprises storing the data resource changing event occurring in the mobile terminal, confirming a specialist previously set to process the data resource changing event, calling the confirmed specialist to process the data resource changing event, and displaying an avatar and text according to event processing results.

In accordance with a another aspect of embodiments of the present invention, there is provided a method for processing a data resource changing event in a mobile terminal. The method comprises displaying an avatar and text recommending a user to change a data resource when a preset resource changing timer generates a timer event, displaying a list of data resource types when the user selects a change of the data resource, and changing the current data resource to a new data resource selected from the list.

BRIEF DESCRIPTION OF THE DRAWINGS

The above and other objects, exemplary features and advantages of embodiments of the present invention will be more apparent from the following detailed description of certain exemplary embodiments taken in conjunction with the accompanying drawings, in which.

Throughout the drawings, like reference numbers should be understood to refer to like elements, features, and structures.

DETAILED DESCRIPTION OF EXEMPLARY EMBODIMENTS

The matters exemplified in this description are provided to assist in a comprehensive understanding of various exemplary embodiments of the present invention disclosed with reference to the accompanying figures. Accordingly, those of ordinary skill in the art will recognize that various changes and modifications of the exemplary embodiments described herein can be made without departing from the scope and spirit of the claimed invention. Descriptions of well-known functions and constructions are omitted for clarity and conciseness.

Figure 1:
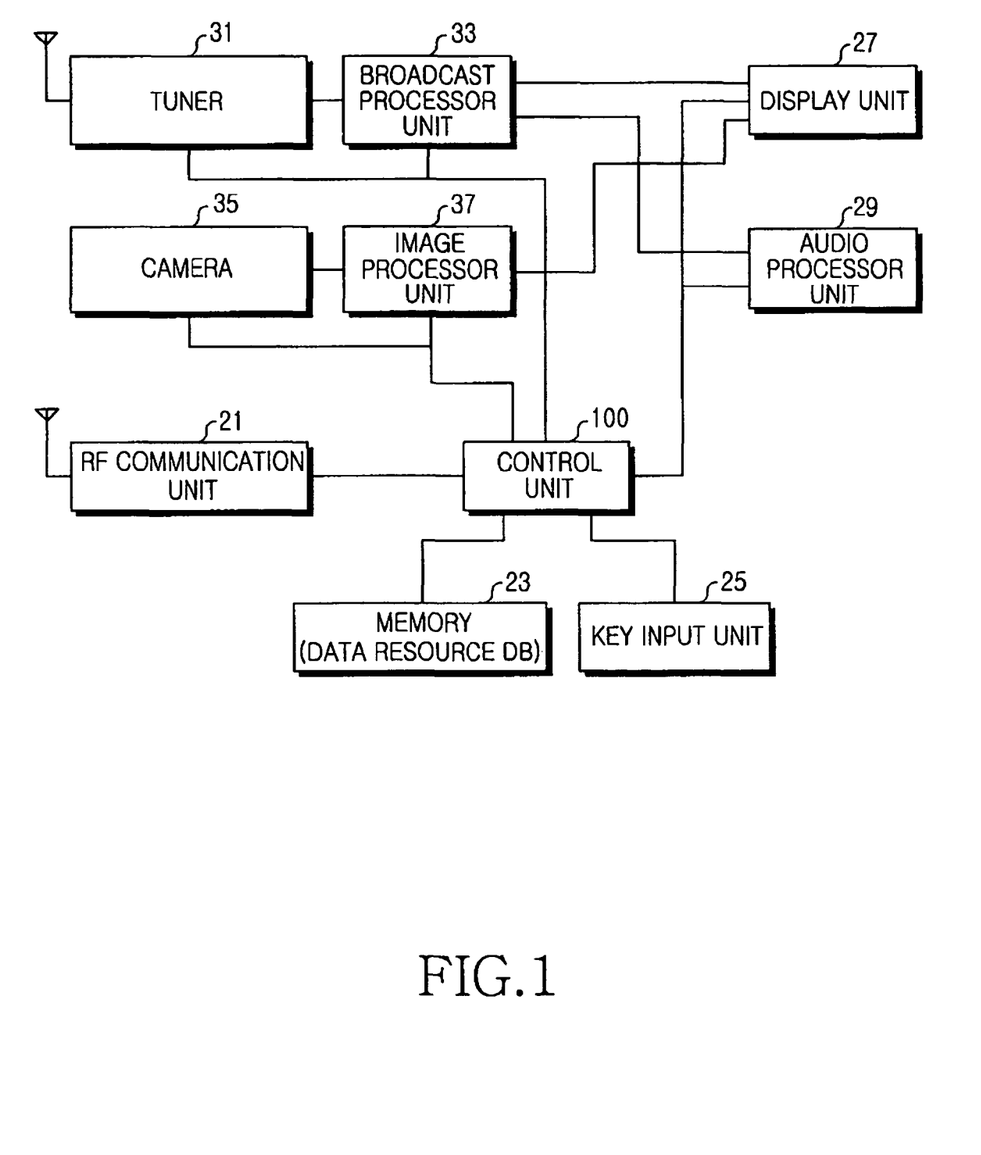
FIG. 1 is a block diagram of a mobile terminal according to an exemplary embodiment of the present invention.

FIG. 1 is a block diagram of a mobile terminal according to an exemplary embodiment of the present invention. Referring to FIG. 1, a radio frequency (RF) unit 21 performs a wireless communication function in the mobile terminal. The RF unit 21 comprises an RF transmitter for performing upward conversion and amplification of the frequency of a transmitted signal, and an RF receiver for amplifying a received signal with low noise and performing a downward conversion of the frequency of the signal.

A key input unit 25 is provided with keys for inputting numbers and characters, and function keys for setting up various functions. The key input unit 25 can also include keys for controlling a character agent corresponding to each data resource changing event in accordance with an exemplary embodiment of the present invention.

A memory 23 may be composed of program memory and data memory. The program memory includes programs for processing call signals and those for controlling agent expressions to correspond to data resource changing events generated in the mobile terminal. The data memory temporarily stores data generated during implementation of the above programs. The memory 23 can also comprise a character memory for storing character images for agent expressions in accordance with the present invention. The character memory can run as a file system. Also, each character image can have an index of the memory (or file system). The character memory can store character images classified according to the gestures, facial expressions and items of a character. In other words, the character memory can store character information classified by image for agent expressions.

The memory 23 also comprises a data resource database in accordance with an exemplary embodiment of the present invention. Alternatively, the data resource database may be separately provided without being included in the memory 23. The data resource database stores various data resources, such as wallpaper images, ring tones and letter fonts, which were previously stored in appropriate fields before putting the mobile terminal on the market. The data resource database also stores data resources downloaded by the user through accessing the Internet. Although wallpaper images, ring tones and letter fonts will be explained as examples of data resources in the following description, the present invention is also applicable to any data resource, such as icons, avatars or an audio resource.

A control unit 100 controls overall operations of the mobile terminal. The control unit 100 comprises a modem for modulating and demodulating a signal and a codec for coding and decoding a signal so as to modulate and code a signal to be transmitted, and to demodulate and decode a received signal. The control unit 100 can be an Mobile Station Modem (MSM) chip. According to the user's mode selection, the control unit 100 controls the implementation of a communication mode, camera mode and a broadcasting reception mode. In an alternate embodiment, the modem and the codec are separate from the control unit 100 to form an independent data processor. In such a case, the data processor can be placed between the control unit 100 and the RF unit 21.

The control unit 100 can comprise an agent function part for processing a data resource changing event according to an exemplary embodiment of the present invention. The agent function part collects data resource changing events occurring in the mobile terminal, controls an agent to process each event, and expresses the processing results with a character agent. For the agent expression, the agent function part selects a corresponding character from the memory 23 and displays the selected character. The agent function part can be either included in the control unit 100 or separately provided. A detailed explanation of the agent function part will be provided with reference to FIG. 2.

The control unit 100 can perform the same operations that can be performed by the agent function part. In particular, when a data resource changing event occurs in the mobile terminal, the control unit 100 deletes a previously set timer and sets a new resource changing timer. When the resource changing timer generates a timer event, the control unit 100 resets the timer and displays an avatar and text recommending a data resource change. The resource changing timer can be set to generate a timer event at regular intervals in order to recommend the user of a data resource change. The timer can be initially set in the mobile terminal. Alternatively, the timer can be set directly by the user or automatically upon the user's approval/rejection of the recommendation for a data resource change.

The control unit 100 can also include a timer managing part for setting the resource changing timer.

A camera module 35 is operated by the control unit 100 when the user selects the camera mode. The camera module 35 takes pictures and generates the image signals. An image processor unit 37 scales up or down an image signal taken by the camera module 35 so that it conforms to the size of a display unit 27 and then outputs the image signal to be displayed on the display unit 27. In a save mode, the image processor unit 37 encodes the image signal in a preset manner and stores the encoded image signal. In a reproduction mode, the image processor unit 37 decodes received or stored image data.

A tuner 31 receives a broadcasting signal of a set channel in the broadcasting reception mode under the control of the control unit 100. A broadcast processor unit 33 demodulates and decodes the broadcasting signal received by the turner 31 into a video signal and an audio signal. The broadcast processor unit 33 outputs the video signal to the display unit 27 and the audio signal to an audio processor unit 29. The broadcasting signal can comprise a satellite broadcasting signal or a terrestrial broadcasting signal.

The display unit 27 displays menus for selecting specific functions or operations under the control of the control unit 100. When a data resource changing event occurs in the mobile terminal, the display unit 27 displays a character image corresponding to the event. In the camera mode or the broadcasting reception mode, the display unit 27 displays an image signal outputted from the image processor unit 37 or the broadcast processor 33. Also, the display unit 27 displays a data resource change (for example, a change in wallpaper, letter font, or icon).

The audio processor unit 29 processes an audio signal generated during the communication mode under the control of the control unit 100. Also, the audio processor unit 29 processes an audio signal generated during the camera mode, and a broadcasting audio signal received under control of the broadcast processor unit 33 during broadcasting reception mode.

A mobile terminal in accordance with embodiments of the present invention can exclude the camera module or broadcast processor unit. In the following description, it is assumed that a "character" refers to an avatar. Although an avatar agent control will be explained as a character agent control for a data resource changing event according to an exemplary embodiment of the present invention, any image can be used to process the data resource changing event in accordance with the present invention.

Figure 2:
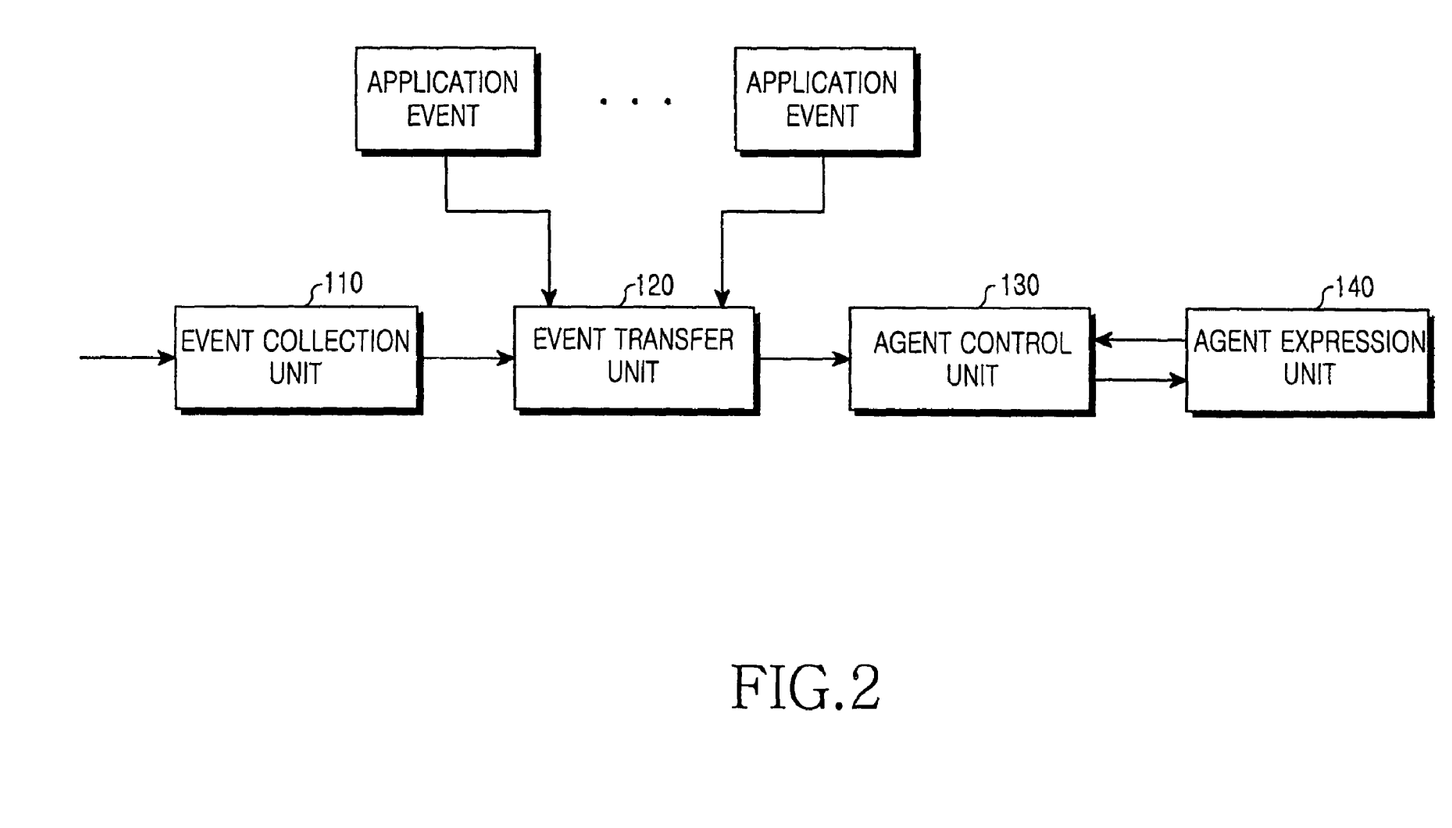
FIG. 2 is a block diagram of an agent function part of a mobile terminal according to an exemplary embodiment of the present invention.

FIG. 2 is a block diagram of the agent function part of the mobile terminal according to an exemplary embodiment of the present invention. Referring to FIG. 2, an event collection unit 110 collects data resource changing events occurring in the mobile terminal. The events include all possible events that can occur in the mobile terminal in relation to communications, operational states of the terminal, user demands, or multimedia functions. The event collection unit 110 collects data resource changing events that are defined in the mobile terminal. When a data resource changing event occurs, the event collection unit 110 generates an event message for identifying the event and transfers the generated event message to an event transfer unit 120.

The event transfer unit 120 delivers the event message received from the event collection part 110 to a corresponding client. In the following description, it will be explained that the event transfer unit 120 delivers the event message only to an agent control unit 130. However, if there is another unit or part requesting the event message, the event transfer unit 120 will also deliver the event message to the other unit or part.

When an event message is received from the event transfer unit 120, the agent control unit 130 stores the received event message in an inner buffer thereof. Also, the agent control unit 130 analyzes the event message and determines a UI to express a corresponding character agent. The event message delivered from the event transfer unit 120 can be a message identifying a data resource changing event that has occurred in the mobile terminal (that is, an event collected by the event collection unit 110). The following description of the invention will focus on agent expressions for the data resource changing events collected by the event collection unit 110.

The agent control unit 130 controls a plurality of specialists provided therein and selects a specialist corresponding to each data resource changing event occurring in the mobile terminal for an agent control function. When a data resource changing event is received, the agent control unit 130 notifies an appropriate specialist of the occurrence of the event and requests an agent expression unit 140 to provide a corresponding UI so that the selected specialist can finally display an agent expression. Also, the agent control unit 130 processes feedback information provided by the user regarding the data resource changing event.

The agent expression unit 140 displays a character expression corresponding to the data resource changing event according to the agent UI information outputted from the agent control unit 130. The agent expression unit 140 manages a plurality of avatar UIs that can be displayed on the display unit 27, and controls display of an avatar corresponding to a specific data resource changing event according to the UI information requested by the agent control unit 130. When the user generates feedback information during the display of an avatar corresponding to an event, the agent expression unit 140 sends the received feedback information to the agent control unit 130. The agent control unit 130 then controls the agent according to the user feedback information received from the agent expression unit 140.

In the structure of FIG. 2, the event transfer unit 120 may be unnecessary when processing only data resource events collected by the event collection unit 110. The inner buffer of the agent control unit 130 will be referred to as a blackboard hereinafter.

The structure and operation of the agent control unit 130 will be explained in more detail. The agent control unit 130 comprises a plurality of specialist which are called according to the types of data resource changing events to process the events and output the processing results. The agent control unit 130 further comprises a blackboard for storing various information including information on event messages, a supervisor for selecting one of the plurality of specialists outputting effective results, an avatar value storage part for storing values of avatar images according to the data resource changing events occurring in the mobile terminal, and a specialist manager for selecting a specialist from a list of specialists for respective events when a specific event occurs, and for controlling an agent expression according to the event.

The specialists contribute to solve problems. With expertise in specific fields, the specialists record intermediate-level solutions in the blackboard and express a priority and a user preference to the intermediate-level solutions. Each specialist grasps the condition of the blackboard, requests calculation of the priority and user preference, and records the intermediate-level solutions in the blackboard.

The blackboard is a working environment and information space in which the specialists communicate with one another. Basically, the blackboard allows the specialists to record the intermediate-level solutions therein. The blackboard pattern has some advantages. First, the blackboard can easily incorporate different kinds of specialists. Second, the blackboard can be independently modularized because the specialists have relatively little influence on each other. Third, the blackboard is flexible to various changes (such as changes in algorithm of the specialists and addition of a new specialist).

When two or more specialists are selected for one event, the specialist manager requests the supervisor to select the specialist most relevant to the received event. Then the supervisor analyzes the data in the blackboard and the priority and user preference to the event in order to select the most relevant specialist.

The avatar value varies depending on the events occurring in the mobile terminal, agent function, and user feedback. In addition, the avatar value changes according to various application events. An avatar interface changes with the change in avatar value. Also, an avatar grows as time elapses, which represents an avatar growth concept. The mobile terminal according to an exemplary embodiment of the present invention can grow an avatar on the basis of on an artificial intelligence agent system. In this respect, the mobile terminal recommends that the user take specific actions regarding various data resource changing events so that the user can effectively use and enjoy the terminal. The avatar value also changes according to user feedback.

Hereinafter, a process for processing a data resource changing event in a mobile terminal having the structure of FIGS. 1 and 2 will be explained in detail with reference to FIGS. 3 through 8.

Figure 3:
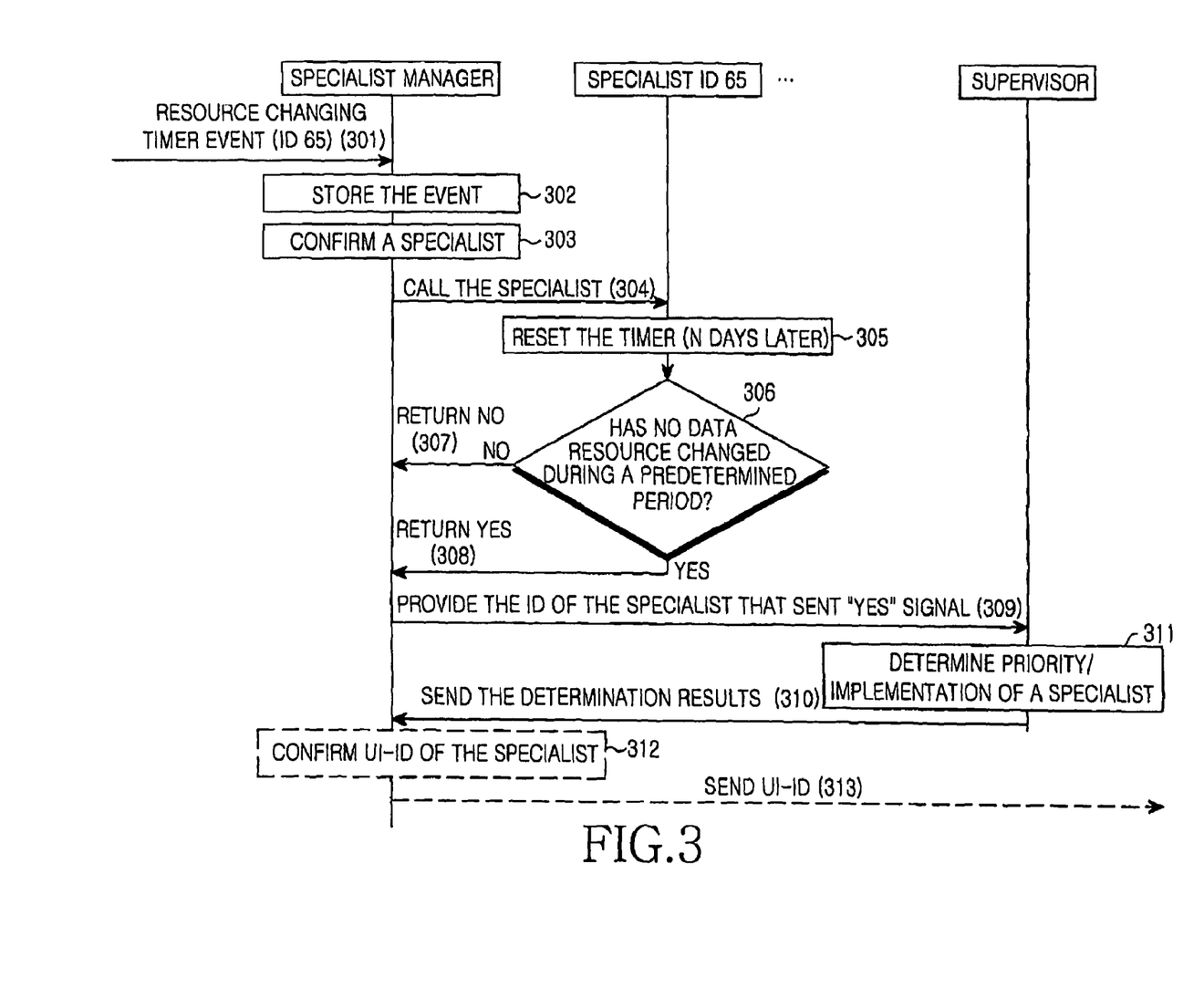
FIG. 3 is a flow chart showing the operations of an agent function part of a mobile terminal to recommend and perform a data resource change according to an exemplary embodiment of the present invention.

FIG. 3 is a flow chart showing the operations of the agent function part of the mobile terminal to recommend and perform a data resource change according to an exemplary embodiment of the present invention. For explanatory convenience, only the operations within the agent control part are illustrated in FIG. 3.

Referring to FIG. 3, when a resource changing timer event (for example, ID 65 event) is transferred to the specialist manager in step 301, the specialist manager stores the received timer event in the blackboard in step 302. The specialist manager checks a specialist list in step 303 to confirm one or more specialists that can be called when the ID 65 event occurs. The specialist manager then calls the specialist(s) in step 304 (by way of non-limiting example, FIG. 3 shows that a specialist having ID 65 is called).

In step 305, specialist ID 65 resets the resource changing timer so that the timer event can occur N days later. The timer can be initially set in the mobile terminal to generate a timer event N days later. Alternatively, the timer can be set directly by the user or automatically upon the user's approval/rejection of the recommendation for a data resource change. Specialist ID 65 is called again N days later to reset the resource changing timer. In other words, specialist ID 65 is periodically called at regular intervals (every N days).

In step 306, the specialist checks the date of the latest data resource change and determines whether a data resource has been changed during a period of time. If the data resource has been changed during the period of time (in other words, if the user has not failed to change the data resource), the specialist will proceed to step 307 in order to send a "no" signal to the specialist manager. If the data resource has not changed during the same period of time (in other words, if the user has failed to change the data resource), the specialist will proceed to step 308 in order to send a "yes" signal to the specialist manager.

When receiving a return signal from the called specialist (that is, specialist ID 65), the specialist manager provides the ID of the specialist that has sent a "yes" signal to the supervisor in step 309, that is, ID 65. The supervisor proceeds to step 311 to determine the top priority among the specialists if two or more specialists have sent a "yes" signal. When only one specialist has sent a "yes" signal, the supervisor determines whether the specialist should be implemented. The supervisor then transfers the determination results to the specialist manager in step 310. Based on the results, the specialist manger confirms a UI-ID preset to the top priority specialist or the specialist to be implemented in step 312 and sends the UI-ID to the agent expression unit in step 313 so as to express a corresponding UI. The expressed UI can be an avatar and text recommending a data resource change.

Figure 4:
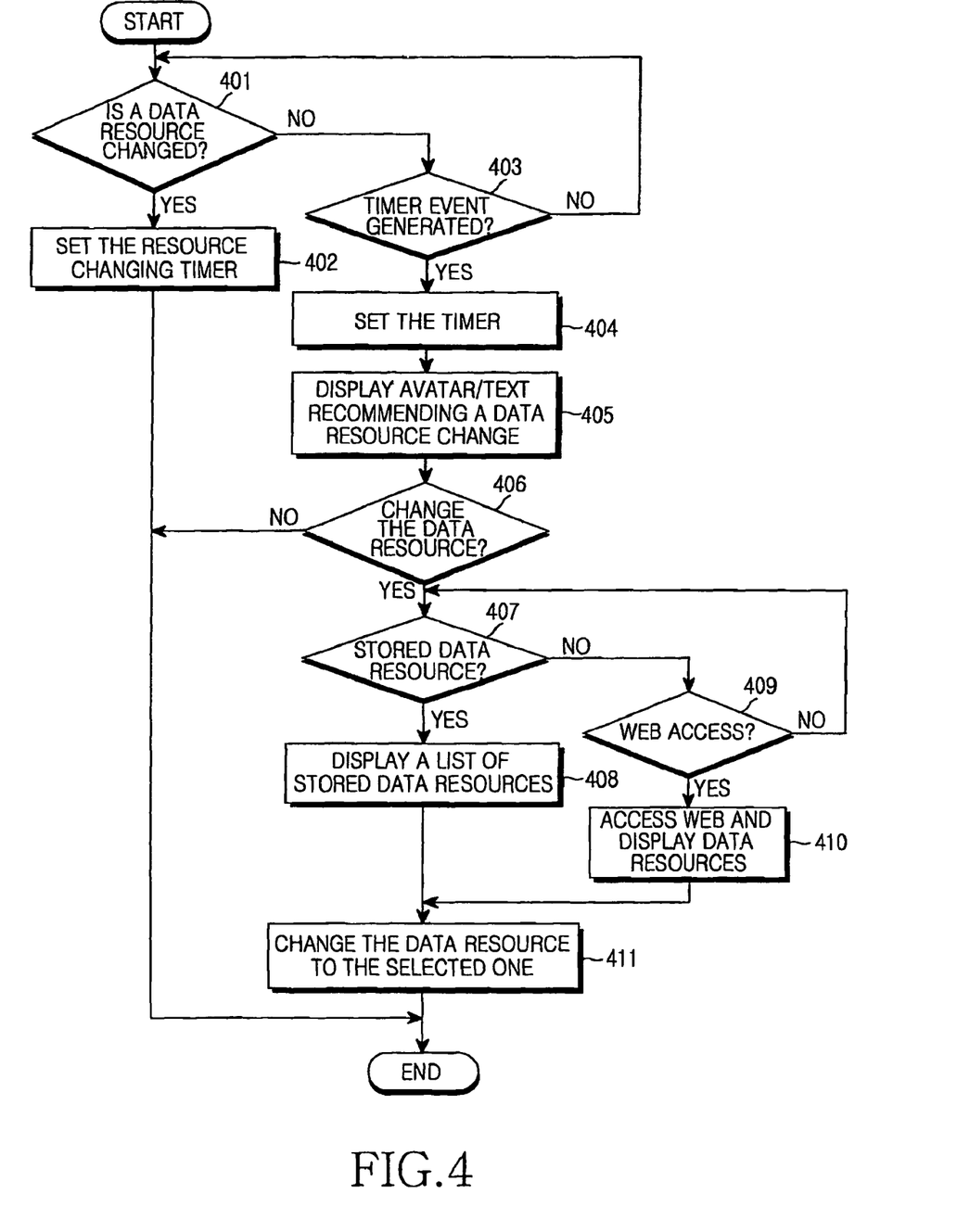
FIG. 4 is a flow chart showing a process for changing a data resource in a mobile terminal according to a another exemplary embodiment of the present invention.

FIG. 4 is a flow chart showing a process for changing a data resource in a mobile terminal according to another exemplary embodiment of the present invention. If the agent function part of FIG. 2 is provided separately from the control unit 100 or is not provided in the mobile terminal, the operations for processing a data resource changing event can be performed under the control of the control unit 100.

Referring to FIG. 4, when a user changes a data resource in the mobile terminal, the control unit 100 detects the change in step 401 and proceeds to step 402 in order to delete the previously set resource changing timer and reset the timer.

Figure 5A:
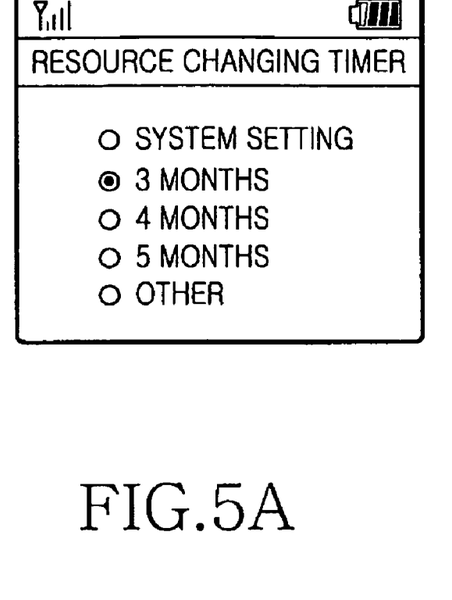
FIG. 5A illustrates a mode for setting a resource changing timer in a mobile terminal according to an exemplary embodiment of the present invention.

In step 402, the timer may be automatically set to generate a timer event at regular intervals as initially set in the mobile terminal. Alternatively, the timer may be set directly by the user through a menu as shown in FIG. 5A. A process of setting the resource changing timer will be explained later.

When no data resource change is detected in the mobile terminal, the control unit 100 then determines whether the resource changing timer generates a timer event in step 403. For example, if the timer has been set to generate a timer event on April 1st, a timer manager will inform the control unit 100 of the timer event when generated. The control unit 100 sets and manages the resource changing timer based on the information received from the timer manager.

When the resource changing timer generates a timer event, the control unit 100 detects the signal in step 403 and proceeds to step 404 in order to delete the previously set resource changing timer and reset the timer.

Figure 5B:
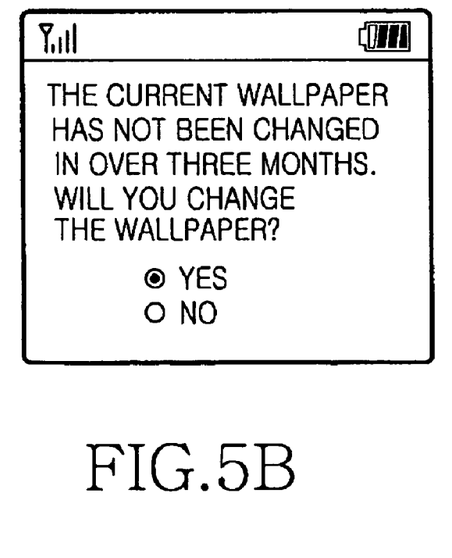
FIG. 5B illustrates text recommending a data resource change in a mobile terminal according to an exemplary embodiment of the present invention.

When the timer is reset in step 404, the control unit 100 proceeds to step 405 in order to display an avatar and text recommending a change in the data resource. In step 405, the data resource changing recommendation can be a display of a text recommendation as shown in FIG. 5B or an output of voice information, image, or motion picture recommending a data resource change.

Figure 7A:
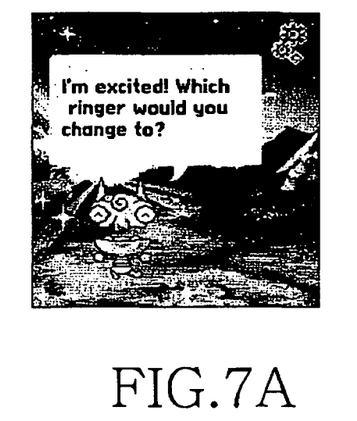
FIGS. 7A through 7C illustrate avatar images displayed on a mobile terminal to recommend a change of ring tone according to an exemplary embodiment of the present invention.
Figure 7B:
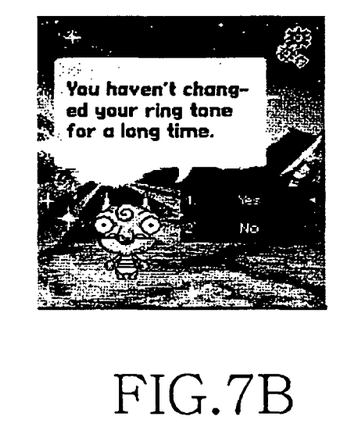
Figure 7C:
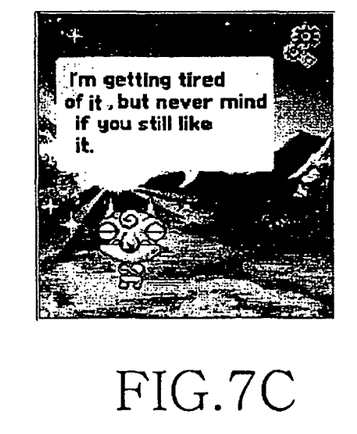
Figure 8A:
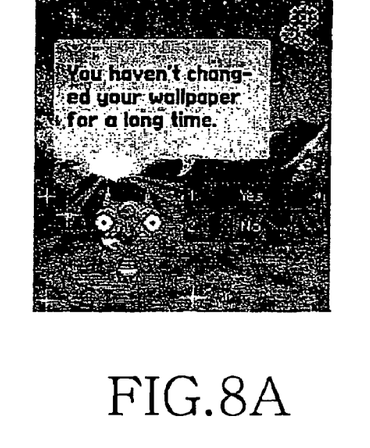
FIGS. 8A through 8C illustrate avatar images displayed on a mobile terminal to recommend a change of wallpaper according to an exemplary embodiment of the present invention.
Figure 8B:
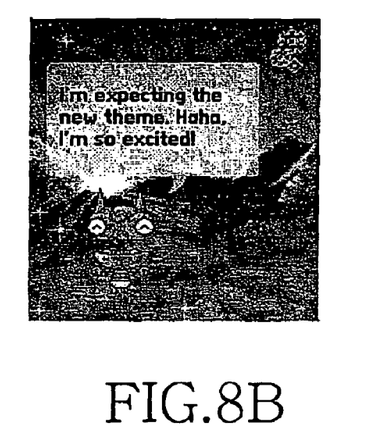
Figure 8C:
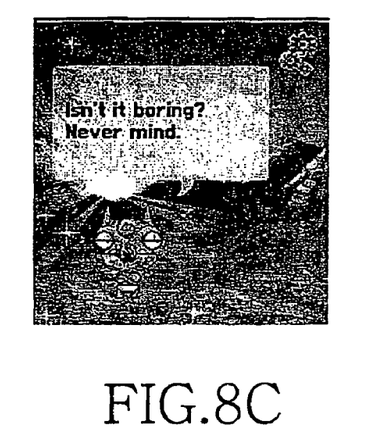

For example, an avatar as illustrated in FIG. 7A can be used in step 405 to recommend the user to change the ring tone. If the user selects "yes," an avatar and text as illustrated in FIG. 7B will be displayed. If the user selects "no," an avatar and text as illustrated in FIG. 7C will be displayed. Similarly, an avatar as illustrated in FIG. 8A can be used to recommend the user to change the wallpaper. According to the user's selection "1. yes" or "2. no," a different avatar image and text will be displayed as illustrated in FIGS. 8B and 8C.

When the user inputs an approval to accept the data resource changing recommendation in step 405, the control unit 100 detects the approval in step 406 and displays a list of data resource types. When the user selects "stored data resource" from the listed types, the control unit 100 detects the selection in step 407 and proceeds to step 408 in order to display a list of data resources stored in the data resource database of the memory 23. When the user selects one of the stored data resources, the control unit 100 then changes the current data resource to the selected new data resource in step 411.

When the user selects "web access" from the listed data resource types, the control unit 100 detects the selection in step 409 and proceeds to step 410 in order to access a web server and display a list of recent data resources. When the user selects one of the displayed data resources, the control unit 100 then changes the current data resource to the selected new data resource in step 411. The selected data resource can then be downloaded and stored in the data resource database of the memory 23.

The resource changing timer setting process in FIG. 5A will be explained. The timer can be set to generate a timer event at regular intervals which can be selected from system setting (default intervals), 3 months, 4 months, 5 months and other periodic intervals directly provided by the user.

The "system setting" in FIG. 5A is a timer that can be set automatically upon the user's approval/rejection of the recommendation for a data resource change. If the "system setting" is selected for the resource changing timer, the control unit 100 will store the number of approvals/rejections provided by the user when the resource changing timer generates a timer event and recommends a data resource change. According to the number of approvals/rejections, the control unit 100 can reduce or increase the length of the default intervals at which the resource changing timer generates a timer event. However, when the user changes a data resource before the generation of the timer event, the default intervals are maintained.

For example, assuming that the default intervals in the "system setting" are 3 months, the resource changing timer generates a timer event every three months unless the user changes a data resource beforehand. If the user rejects changing the data resource when the resource changing timer generates the timer event and recommends a change of the data resource, the control unit 100 will store the rejection. If the user rejects again when the resource changing timer generates the timer event three months later, the control unit 100 will automatically increase the length of the default interval to "4 months."

On the other hand, when the resource changing timer generates a timer event to recommend a change of the data resource, the user may approve the change. If the user approves the change again when the resource changing timer generates the timer event three months later, the control unit 100 will automatically reduce the length of the default timer interval to "2 months."

However, if the user changes the data resource within three months (that is, before generation of the timer event), the default timer interval of three months will be maintained.

The user can also select any of 3 months, 4 months, 5 months and other intervals (directly provided by the user) from the timer setting menu of FIG. 5A. The generation of a timer event when the timer interval is set to 3 months will be explained in detail with reference to FIG. 6.

Figure 6:
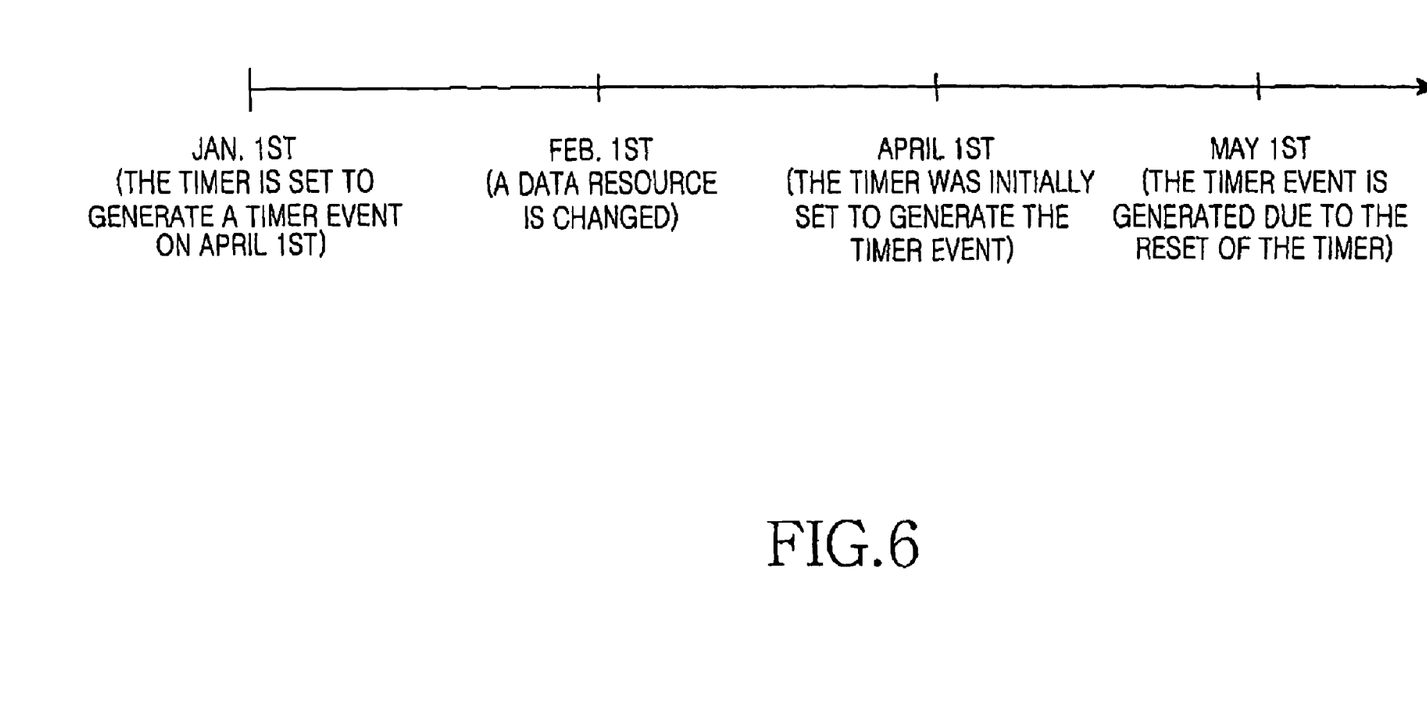
FIG. 6 is a view for explaining how to set a resource changing timer in a mobile terminal according to an exemplary embodiment of the present invention.

Referring to FIG. 6, when the user sets a 3-month interval on January 1st, the control unit 100 controls the timer manager to set the resource changing timer to generate a timer event three months later, that is on April 1st. If the user changes a data resource on February 1st before generation of the timer event (April 1st), the control unit 100 will cancel the resource changing timer setting of April 1st and reset the timer to generate the timer event on May 1st.

As explained above, when a data resource changing event occurs in the mobile terminal with a character agent function according to the present invention, the mobile terminal processes the data resource changing event by selecting a corresponding character UI and expressing the selected character UI.

If a data resource, such as ring tone or wallpaper, has not been changed for a long period of time, the mobile terminal will automatically recommend the user to change the current data resource to a new data resource, thereby enabling the user to effectively use the data resource. Also, periodic changes of a data resource will prevent the user from becoming bored with the data resource being used for a long time.

While the present invention has been particularly shown and described with reference to certain exemplary embodiments thereof, it will be understood by those of ordinary skill in the art that various changes in form and detail may be made therein without departing from the spirit and scope of the present invention as defined by the appended claims and equivalents thereof.

What is claimed is:

1. A device for processing a data resource changing event in a mobile terminal, comprising:
   a memory for storing a character user interface (UI) image to recommend a change of a data resource when the data resource changing event occurs;
   an event collection part for detecting the data resource changing event and generating an event message for identifying the data resource changing event;
   an agent control part comprising a plurality of specialists for processing the data resource changing event, selecting a specialist corresponding to a data resource changing event from among the plurality of specialists and selecting a character UI identification (ID) possessed by the selected specialist for the data resource changing event; and
   an agent expression part for accessing and outputting a character image and text corresponding to the character UI ID;
   wherein the data resource changing event recommends the data resource change when the data resource has not been changed during a period of time;
   wherein the selected specialist, in processing the data resource changing event, sets a resource changing timer such that a second data resource changing event occurs when the resource changing timer expires.

2. A method for processing a data resource changing event in a mobile terminal, the method comprising:
   storing the data resource changing event;
   confirming a specialist previously set to process the data resource changing event from among a plurality of specialists for processing the data resource changing event;
   calling the confirmed specialist to process the data resource changing event; and
   displaying an avatar and text, without user input, recommending a user to change a data resource according to the data resource changing event processing results;
   wherein the confirmed specialist sets a timer such that a second data resource changing event occurs when the resource changing timer expires, checks whether a data resource has been changed during a period of time, and displays an avatar and text recommending a change of the data resource when the data resource has not been changed during the period of time.

3. A method for processing a data resource changing event in a mobile terminal, the method comprising:
   confirming a specialist previously set to process the data resource changing event from among a plurality of specialists when a resource changing timer generates a timer event;
   calling the confirmed specialist o process the data resource changing event;
   displaying an avatar and text, without user input, recommending a user to change a data resource by the confirmed specialist;
   displaying a list of data resource when the user selects a change of the data resource; and changing a current data resource to a new data resource selected from the list, resetting the resource changing timer such that a second data resource changing event occurs when the resource changing timer expires.

4. The method according to claim 3, wherein the resource changing timer is preset.

5. The method according to claim 3, further comprising: resetting the resource changing timer if the user changes the data resource before the resource changing timer expires.

6. The method according to claim 3, wherein timer intervals of the resource changing timer are set by at least one of a default setting in the mobile terminal, directly set by the user, or automatically adjusted according to the user's approval/rejection of the recommendation for a data resource change.

7. The method according to claim 5, wherein timer intervals of the resource changing timer are set by at least one of a default setting in the mobile terminal, directly set by the user, or automatically adjusted according to the user's approval/rejection of the recommendation for a data resource change.

8. The method according to claim 3, wherein said displaying a list of data resource types comprises:

displaying a list of data resources stored in the mobile terminal when the user selects stored data resource from the listed types; and accessing a web server and displaying a list of data resources when the user selects web access from the listed types.

9. The method according to claim 3, wherein the recommendation for a data resource change comprises an output of at least one of text, voice information, image, and motion picture.

10. The method according to claim 3, wherein said data resource comprises at least one of wallpaper, ring tone, letter font, theme music, theme background and an icon.

* * * * *